(12) United States Patent
Yamazaki et al.

(10) Patent No.: US 6,463,646 B2
(45) Date of Patent: Oct. 15, 2002

(54) METHOD OF CALKING CYLINDRICAL MEMBER IN HOLE

(75) Inventors: Yasuhiko Yamazaki, Toyota (JP); Akinori Nakayama, Kariya (JP); Minoru Watanabe, Inabe-gun (JP); Shinya Mitani, Inabe-gun (JP); Toshiharu Mizuno, Kuwana (JP); Hidenobu Kajita, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/892,564

(22) Filed: Jun. 28, 2001

(65) Prior Publication Data

US 2002/0011206 A1 Jan. 31, 2002

(30) Foreign Application Priority Data

Jul. 31, 2000 (JP) ........................................ 2000-231648

(51) Int. Cl.⁷ ......................... B21D 39/00; B23Q 17/00
(52) U.S. Cl. ........................ 29/407.01; 29/515; 29/520
(58) Field of Search ......................... 29/520, 516, 505, 29/509, 510, 515, 407.01, 407.05

(56) References Cited

FOREIGN PATENT DOCUMENTS

| JP | 405332890 | * 12/1993 |
|----|-----------|-----------|
| JP | 6-58451   | 3/1994    |

* cited by examiner

Primary Examiner—David P. Bryant
Assistant Examiner—John C. Hong
(74) Attorney, Agent, or Firm—Law Offices of David G. Posz

(57) ABSTRACT

A cylindrical member is placed in a dead-end hole formed in a housing made of a material such as aluminum. A peripheral portion of the hole is pressed down to plastically deform the housing material and to supply the deformed material into a groove formed on an outer periphery of the cylindrical member. The cylindrical member is calked to the housing in this manner. To supply a proper amount of deformed material into the groove for obtaining a quality calking, an inflection point of a calking curve indicating a relation of a calking force and a calking stroke is detected during the calking process. After the inflection point is detected, the calking is performed by giving a predetermined calking stroke or by adding a predetermined calking force.

7 Claims, 5 Drawing Sheets

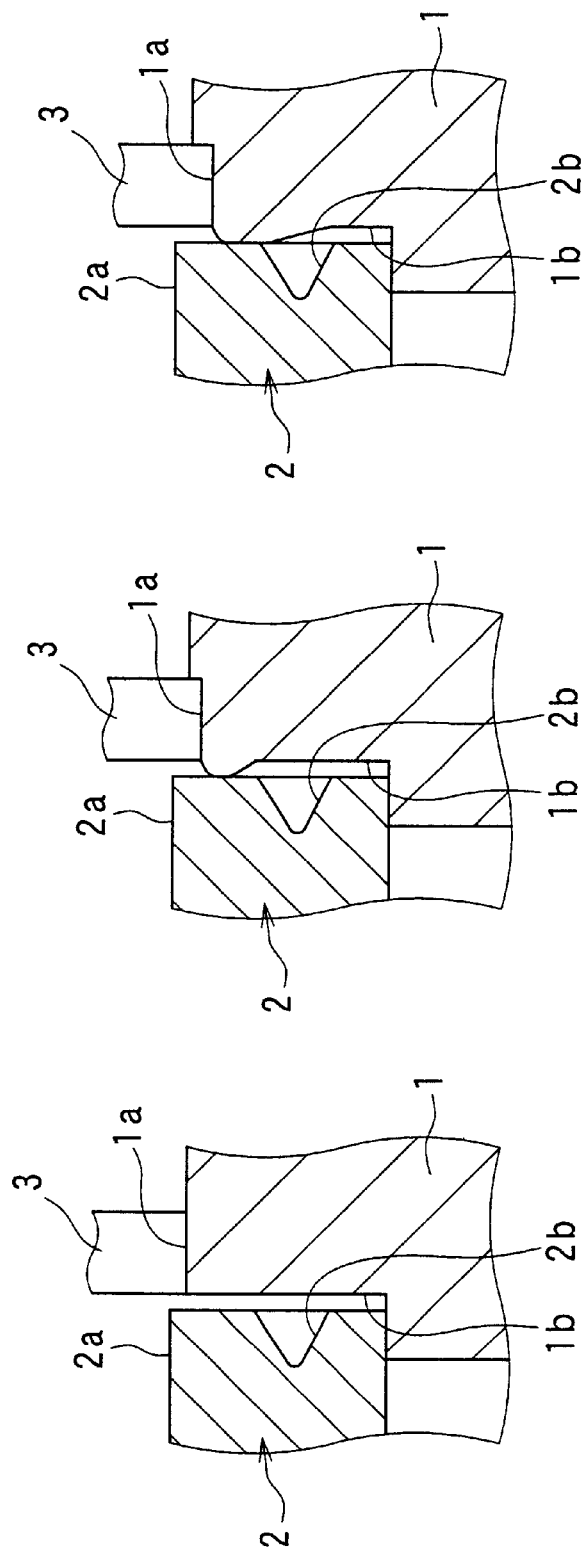

METHOD OF CALKING CYLINDRICAL MEMBER IN HOLE

CROSS-REFERENCE TO RELATED APPLICATION

This application is based upon and claims benefit of priority of Japanese Patent Application No. 2000-231648 filed on Jul. 31, 2000, the content of which is incorporated herein by reference.

BACKGROUND OF THE INVENTION

1. Field of the Invention

The present invention relates to a method of fixing a cylindrical member in a hole by calking. For example, an electromagnetic valve of an ABS actuator is fixed by calking in a hole formed in a housing.

2. Description of Related Art

It is generally known to fix a cylindrical member in a hole by calking. In the conventional calking, either a calking force or a calking stroke is kept constant. The former is called constant pressure calking and the latter is called constant stroke calking. In both calking processes, however, it has been difficult to attain quality calking because dimensions of members to be calked are not always constant. It is especially important to attain quality calking when a high strength and a high sealing ability of a calked portion are required.

To improve the calking quality, it could be possible to machine the members to be calked with high accuracy or to determine calking conditions according to dimensions of respective members. However, it is time-consuming and costly to employ such a process.

SUMMARY OF THE INVENTION

The present invention has been made in view of the above-mentioned problem, and an object of the present invention is to provide an improved calking method in which quality calking is attained in a simple manner.

A member having a cylindrical portion is fixed by calking to a depressed portion formed in a housing. A groove is formed on the outer periphery of the cylindrical portion. A peripheral portion of the depressed portion is pressed down to plastically deform a part of the housing material such as aluminum and to supply the deformed housing material into the groove. Thus, the member having the cylindrical portion is fixed to the housing. This calking method is used, e.g., for fixing electromagnetic valves to an aluminum housing of an ABS actuator.

In the process of deforming the housing material, a relatively large amount of calking force is required until the housing material begins to be supplied into the groove. On the other hand, a relatively small amount of calking force is required during the course of filling the groove with the housing material. This means that a calking curve showing the amount of calking force required relative to the calking stroke has an inflection point. In other words, an inclination of the calking curve is large up to the inflection point and becomes small after the inflection point.

During the calking process, the calking force and the calking stroke are measured to detect the inflection point based on the inclination of the calking curve. A point where the inclination becomes lower than a predetermined value is determined as the inflection point. Alternatively, a point where the inclination changes considerably may be determined as the inflection point. After the calking process reached the inflection point, the calking is performed with a predetermined constant stroke. In this manner, a substantially constant amount of the deformed housing material is supplied into the groove, if there are certain dimensional deviations in members to be calked together. The constant stroke is predetermined, so that an adequate amount of the housing material for obtaining quality calking is supplied into the groove. Instead of setting the constant stroke, a predetermined constant calking force may be added after the inflection point.

According to the present invention, the quality calking having a high mechanical strength and a high sealing ability is realized because a proper amount of the housing material is supplied into the groove.

Other objects and features of the present invention will become more readily apparent from a better understanding of the preferred embodiment described below with reference to the following drawings.

BRIEF DESCRIPTION OF THE DRAWINGS

FIGS. 4A–4C are cross-sectional views showing a process of calking;

DETAILED DESCRIPTION OF THE PREFERRED EMBODIMENT

Figure 1:
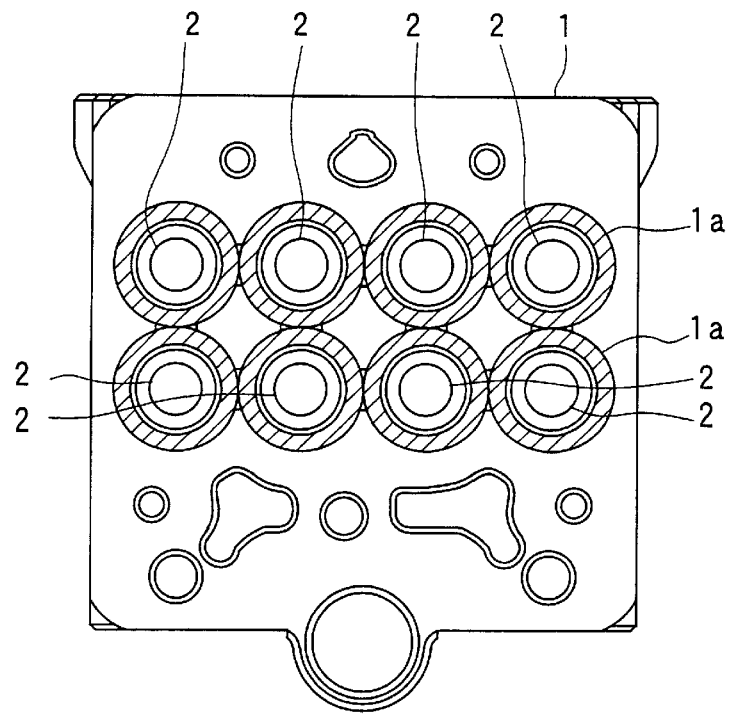
FIG. 1 is a plan view showing an ABS actuator having electromagnetic valves calked in depressed portions formed in a housing.

An embodiment of the present invention will be described with reference to the drawings. FIG. 1 shows an ABS (anti-block braking system) actuator in which electromagnetic valves 2 are calked in depressed portions 1b formed in a housing 1. Plural braking fluid passages are formed in the aluminum housing 1, and electromagnetic valves 2 for opening and closing the fluid passages are fixed to the housing 1 by calking. Among the plural electromagnetic valves 2, four valves control communication in passages connecting a master cylinder and each wheel cylinder, and the other four valves control communication in passages connecting a reserve tank and each wheel cylinder. Since the electromagnetic valves 2 are disposed in a high pressure passages, they have to be liquid-tightly fixed to the housing 1 with a high sealing ability and a high mechanical strength.

Figure 2A:
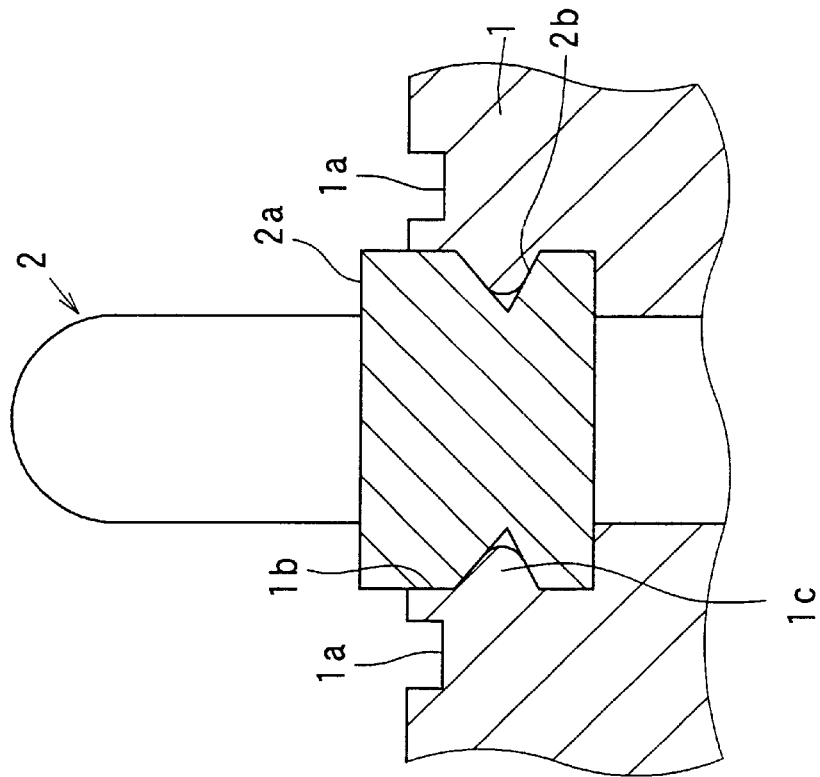
FIG. 2A is a cross-sectional view showing a calking portion before members are calked.
Figure 2B:
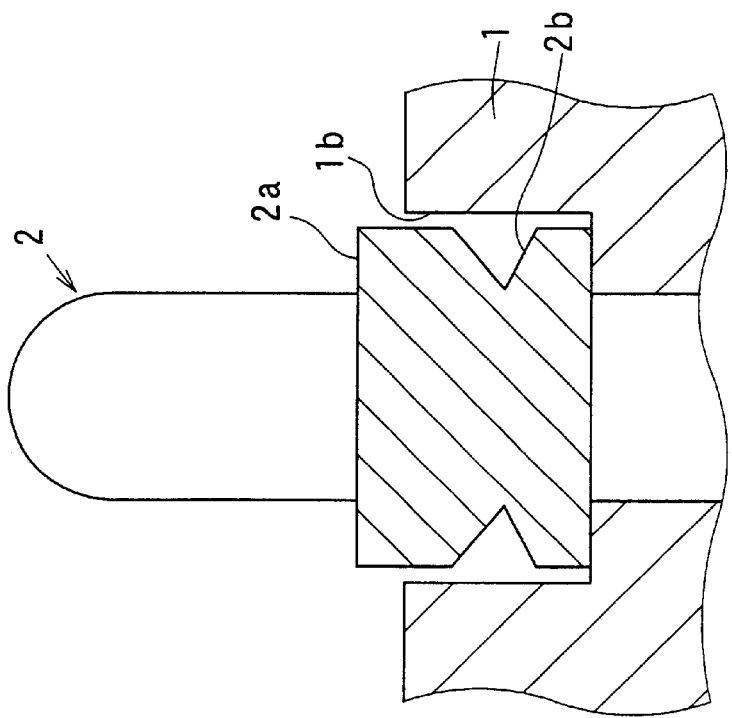
FIG. 2B is a cross-sectional view showing a calking portion after the members are calked.

As shown in FIGS. 1, 2A and 2B, each electromagnetic valve 2 is placed in a depressed portion 1b formed in the housing 1 and fixed to the housing 1 by depressing a peripheral portion 1a around the depressed portion 1b. The calking process according to the present invention will be explained in detail with reference to FIGS. 2A–4C.

FIG. 2A shows a calking portion in which an electromagnetic valve 2 is placed in a depressed portion 1b formed in the housing 1. The electromagnetic valve 2 has a cylindrical portion 2a at which the electromagnetic valve 2 is fixed to the housing 1 by calking. A triangular groove 2b is formed around the cylindrical portion 2a. The diameter of the depressed portion 1b is a little larger than the outer diameter of the cylindrical portion 2a. The thickness of the cylindrical portion 2a is made larger than the depth of the depressed portion 1b, so that a part of the cylindrical portion 2a sticks out from the depressed portion 1b.

FIG. 2B shows the calking portion after the electromagnetic valve 2 is fixed to the housing 1 by calking. A peripheral portion 1a surrounding the depressed portion 1b is pressed down by a cylinder-shaped calking punch. The inner bore of the depressed portion 1b is deformed by the calking. force, and a part of the housing material (aluminum in this embodiment) swells into the groove 2b. In other words, the calking force causes plastic deformation of the housing material and the groove 2b is filled with the housing material. To give a liquid-tight sealing function to the calked portion, the groove 2b has to be filled with a sufficient amount of the housing material, and the housing material has to closely contact the surface of the groove 2b.

Figure 3:
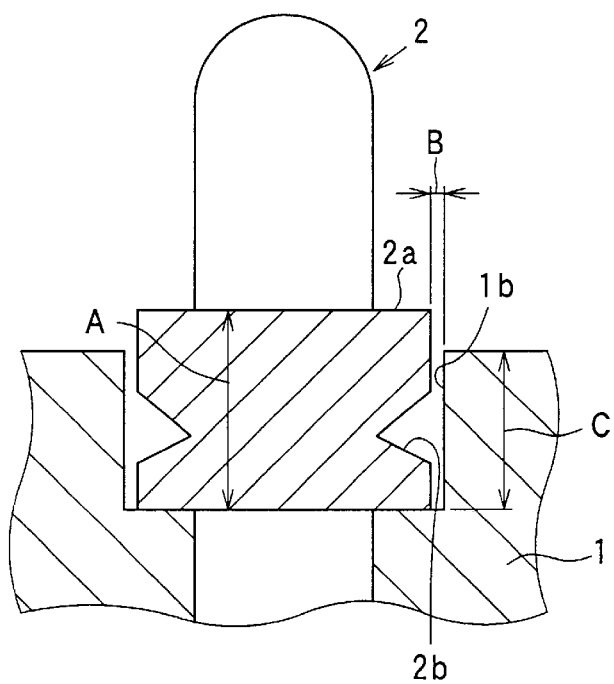
FIG. 3 is a cross-sectional view showing a calking portion where an electromagnetic valve is placed in a depressed portion of a housing.

However, if too much housing material that generates an excessive pressure on the groove surface is supplied into the groove 2b, the electromagnetic valve 2 is deformed by the pressure. Therefore, it is necessary to control the amount of housing material filling the groove 2b within a limited range. That is, the amount of housing material has to be precisely controlled. It is difficult, however, to precisely control the amount of housing material in the conventional calking process. This is because the dimensions of the cylindrical portion 2a and the depressed portion 1b somewhat varies from piece to piece. A clearance B between the cylindrical portion 2a and the depressed portion 1b, the depth C of the depressed portion 1b, and the thickness A of the cylindrical portion 2a, all shown in FIG. 3, are not always constant. Those dimensions deviate piece by piece. Therefore, the amount of housing material cannot be kept constant in the conventional calking process.

In order to realize a calking process in which the amount of housing material that fills the groove 2b is kept substantially constant, the calking mechanism is investigated in detail. The mechanism will be explained with reference to FIGS. 4A–4C. First, as shown in FIG. 4A, the cylindrical portion 2a of the electromagnetic valve 2 is placed in the depressed portion 1b of the housing 1, and a cylindrical calking punch 3 is positioned on the surface of the housing 1. Then, as shown in FIGS. 4B and 4C, a calking force is applied to the punch 3 to press down the peripheral portion 1a. The inner bore of the depressed portion 1b is plastically deformed by the calking force until the deformed housing material fills the groove 2b.

Figure 5:
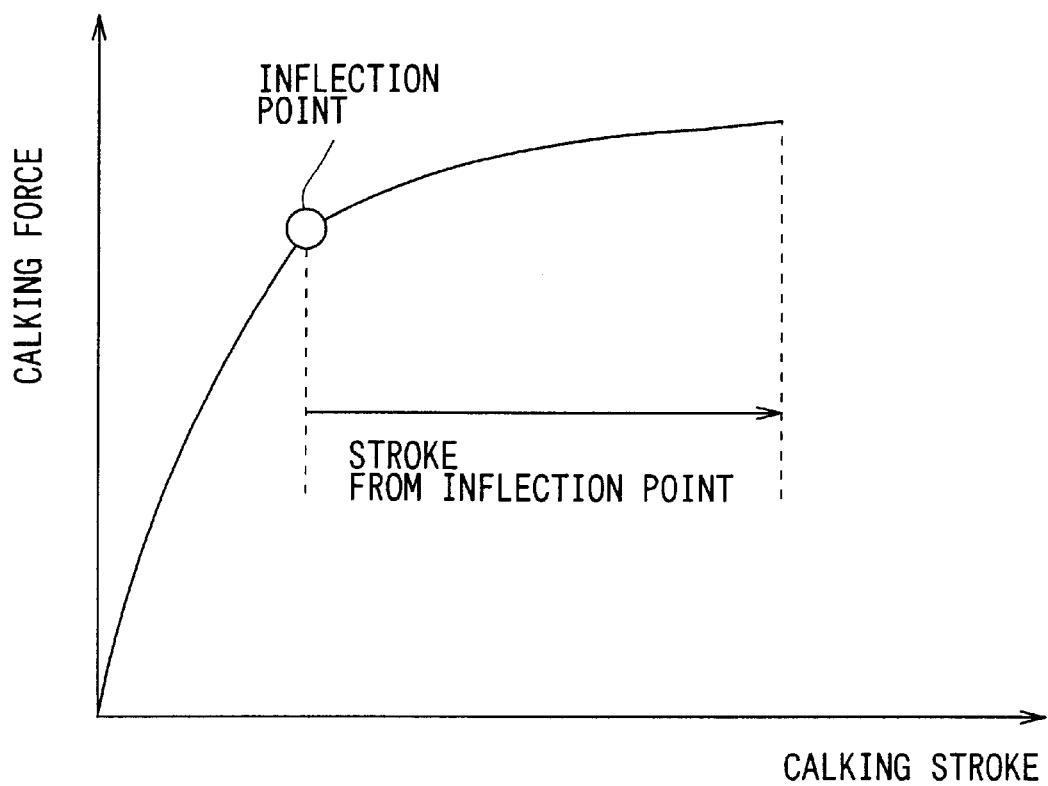
FIG. 5 is a graph showing relation between a calking stroke and a calking force.

The deformed housing material only fills the clearance B during a period from the beginning of the deformation to the point where the deformed material starts to enter the groove 2b. Therefore, during this period, a large calking force is required to make the deformation of the housing material. Once the deformed material beings to enter the groove 2b that has a large space, the punch 3 easily moves downward with a smaller calking force. The calking force versus the caking stroke is plotted in the graph in FIG. 5. As seen in the graph, the curve showing the relation between the calking stroke and the calking force has an inflection point. That is, the curve sharply rises up with a substantially constant inclination up to the inflection point, and it slowly rises after the inflection point. The inflection point corresponds to the point where the deformed housing material begins to enter the groove 2b. Therefore, it is possible to control the amount of deformed material entering the groove 2b on the basis of the inflection point.

According to the investigation results described above, the calking process of the present invention is carried out in the following manner. First, the cylindrical portion 2a of the electromagnetic valve 2 is placed in the depressed portion 1b of the housing 1. Then, the calking force is applied to the punch 3. The calking force applied to the punch 3 and the downward stroke of the punch 3 are measured to find the inflection point. After the inflection point is detected, the punch 3 is pressed down by a stroke which is suitable to supply a desired amount of the deformed material into the groove 2b. Such a suitable stroke is predetermined through experiments.

More particularly, the inclination of the calking curve is calculated during the calking process based on the measured calking force and stroke. A point where the calculated inclination becomes smaller than a predetermined threshold value is determined as the inflection point. Alternatively, the calking force F and the calking stroke S are measured with certain intervals (a sampling method), and the inclination of the calking curve is calculated. A point where an inclination difference between two neighboring measuring points exceeds a predetermined threshold value is determined as the inflection point.

Figure 6:
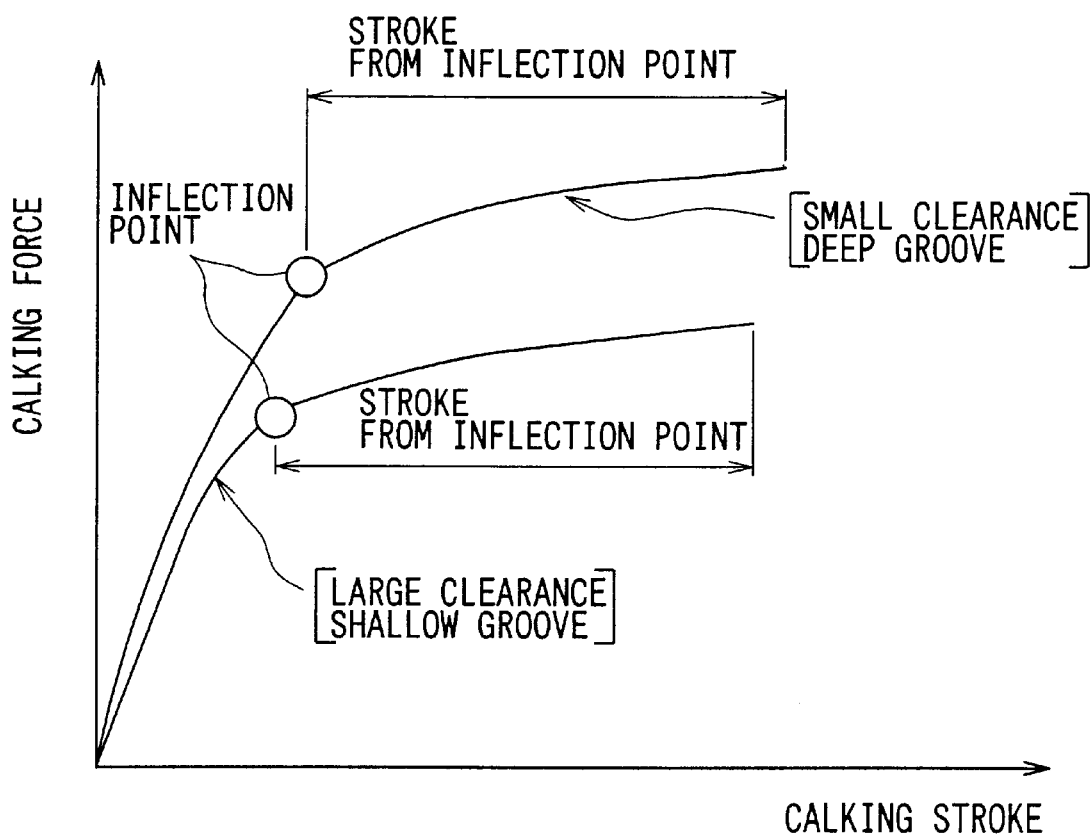
FIG. 6 is a graph showing relation between a calking stroke and a calking force; one curve showing a situation where the members are calked with a small clearance and a deep groove, and the other curve with a large clearance and a shallow groove.

By pressing down the punch 3 by the predetermined stroke from the detected inflection point, the amount of the deformed housing material supplied to the groove 2b is kept substantially constant even if there are deviations in the dimensions A, B and C. As shown in FIG. 6, the calking curve in the case where the clearance B is small and the depth of the groove 2b is deep differs from the calking curve in the case where the clearance B is large and the depth of the groove 2b is shallow. Irrespective of the shape of the calking curve, the quality calking is realized according to the present invention, because the inflection point is always detected in each calking curve and the stroke is measured from the detected inflection point. Further, since the inflection point indicates the position of the groove 2b, it is possible to detect the position of the groove 2b based on the inflection point.

The present invention is not limited to the embodiment described above, but it may be variously modified as long as the amount of housing material supplied to the groove 2b is controlled on the basis of the inflection point. For example, an amount of calking force increase from the inflection point may be controlled at a constant value, or a predetermined amount of the calking force may be added to the calking force applied at the inflection point. Though the calking process for fixing the electromagnetic valve to the ABS actuator housing is shown in the foregoing embodiment, the calking process of the present invention may be applied to other similar members requiring a quality calking.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of calking a cylindrical member having a groove formed on an outer periphery thereof to a depressed portion formed in a housing, the method comprising steps of:

placing the cylindrical member in the depressed portion; and pressing a peripheral portion of the depressed portion to cause plastic deformation of a housing material and to fill the groove with the deformed housing material, wherein:

during the pressing step, an inflection point where an inclination of a calking curve showing a calking force relative to a calking stroke is detected; and an amount of the housing material filling the groove is controlled on the basis of the inflection point.

2. The method of calking as in claim 1, wherein:

the calking stroke from the inflection point is controlled for controlling the amount of the housing material filling the groove.

3. The method of calking as in claim 1, wherein:

the calking force imposed after the inflection point is controlled for controlling the amount of the housing material filling the groove.

4. The method of calking as in claim 1, wherein:

an inclination of the calking curve is calculated during the pressing step; and a point where the inclination becomes smaller than a predetermined threshold value is determined as the inflection point.

5. The method of calking as in claim 1, wherein:

an inclination of the calking curve is detected with certain intervals during the pressing step; and a point where the inclination difference between two neighboring detecting points exceeds a predetermined threshold value is determined as the inflection point.

6. A method of calking a cylindrical member having a groove formed on an outer periphery thereof to a depressed portion formed in a housing, the method comprising steps of:

placing the cylindrical member in the depressed portion; and pressing a peripheral portion of the depressed portion to cause plastic deformation of a housing material and to fill the groove with the deformed housing material, wherein:

during the pressing step, an inflection point where an inclination of a calking curve showing a calking force relative to a calking stroke is detected; and a calking stroke after the inflection point is controlled at a predetermined constant stroke for filling the groove with a substantially constant amount of the housing material.

7. A method of calking a cylindrical member having a groove formed on an outer periphery thereof to a depressed portion formed in a housing, the method comprising steps of:

placing the cylindrical member in the depressed portion; and pressing a peripheral portion of the depressed portion to cause plastic deformation of a housing material and to fill the groove with the deformed housing material, wherein:

during the pressing step, an inflection point where an inclination of a calking curve showing a calking force relative to a calking stroke is detected; and the calking force is increased by a predetermined constant amount after the inflection point for filling the groove with a substantially constant amount of the housing material.

* * * * *